March 8, 1966            W. R. DAVIS            3,238,608
TOOL FOR SETTING JOINTS BY PRODUCING A LONGITUDINAL
DISPLACEMENT OF AN ELONGATED FASTENER
Filed June 4, 1963            8 Sheets-Sheet 1

INVENTOR.
WILLIAM R. DAVIS
BY Lindsey Brutzman and Hayes
ATTORNEYS

INVENTOR.
WILLIAM R. DAVIS
BY Lindsey, Brutzman and Hays
ATTORNEYS

FIG. 6

INVENTOR.
WILLIAM R. DAVIS
BY Lindsey, Prutzman and Hayes
ATTORNEYS

United States Patent Office 3,238,608
Patented Mar. 8, 1966

3,238,608
TOOL FOR SETTING JOINTS BY PRODUCING A LONGITUDINAL DISPLACEMENT OF AN ELONGATED FASTENER
William R. Davis, West Simsbury, Conn., assignor to The Stanley Works, New Britain, Conn., a corporation of Connecticut
Filed June 4, 1963, Ser. No. 285,423
8 Claims. (Cl. 29—200)

The present invention relates to joints of the type having a fastener inserted in opposed elongated slots formed in contiguous surfaces of the joint members, with the joint being united or set by longitudinal displacement of the fastener in the slots, and more particularly to a tool for longitudinally displacing the fastener.

Joints of the type to which the present invention is directed conventionally incorporate an elongated fastener having a plurality of teeth thereon inclined to the longitudinal axis of the fastener and a projecting tab on the end of the fastener useful for displacing the fastener. The joint is usually united by one of two methods. A first method is by inserting the fastener laterally into the slots until the fastener teeth engage the joint members and thereby develop sufficient resistance to prevent further insertion of the fastener, and by subsequently longitudinally displacing the fastener in the slots. In this method the joint members and fastener are preassembled with the joint members laterally spaced and the fastener laterally inserted in the opposed slots. In a second method, fully described in my pending application entitled "Joint," Serial No. 260,381 filed February 25, 1963, the joint members are provided with a plurality of spaced pockets along the opposed slots for receiving the fastener teeth to enable the point to be preassembled with the joint members in abutment. The joint is thereafter united as with the first method by longitudinal displacement of the fastener.

It is a primary aim of the present invention to provide a new and improved tool having notable usefulness for setting a joint of the type described.

It is another aim of the present invention to provide a power-operated tool useful for setting a joint of the type described with the joint members either laterally spaced in the preassembled condition or in abutment.

It is a further aim of the present invention to provide a tool for setting a joint of the type described which maintains the joint members in lateral and longitudinal alignment during the setting of the joint.

Another aim of the present invention is to provide a tool for setting a joint of the type described which is adapted to remove the protruding fastener tab after the joint is set.

It is still another aim of the present invention to provide a tool for setting a joint of the type described which is portable and easy to operate even by an unskilled operator.

Other objects will be in part obvious and in part pointed out more in detail herinafter.

The invention accordingly consists in the features of construction, combination of elements and arrangement of parts which will be exemplified in the construction hereafter set forth, and the scope of the application of which will be indicated in the appended claims.

Figure 1:
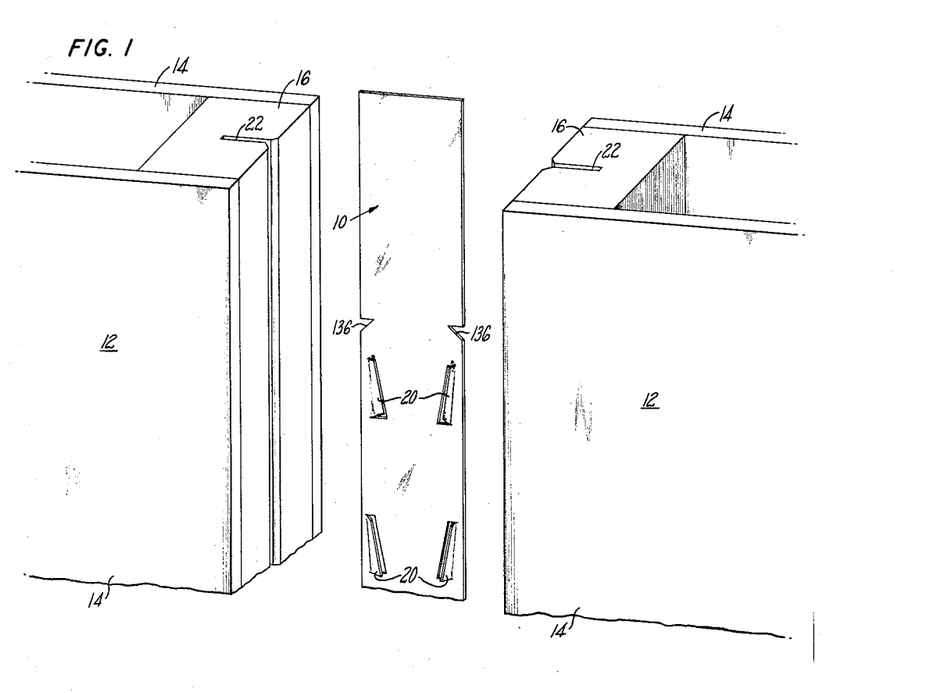
FIG. 1 is an isometric view, partly broken away, showing the parts of a joint of the type to which the present invention is directed.
Figure 2:
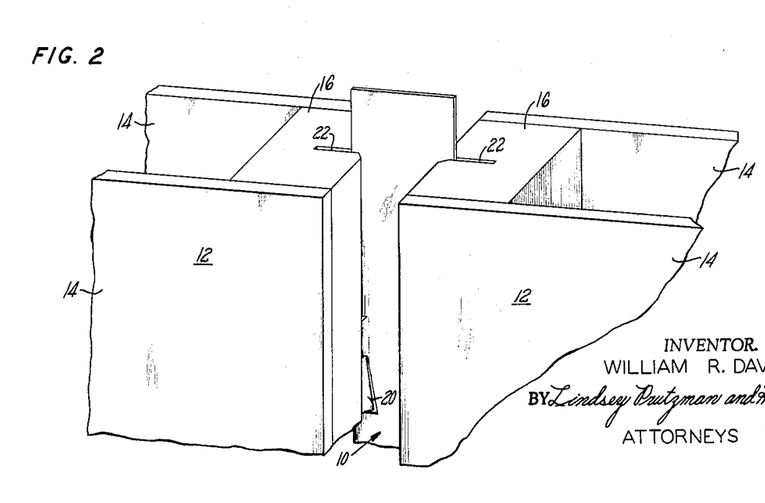
FIG. 2 is an isometric view, partly broken away, showing the parts of the joint of FIG. 1 in a preassembled relationship prior to the setting of the joint.

Referring now to the drawings, in which like characters represent like parts, FIG. 1 shows the parts of a joint of the type to which the present invention is directed which include a fastener 10, hereinafter termed a spline, and a pair of joint members shown to be a pair of panels 12 with spaced face members 14 fixed to elongated edge members 16. The spline 10 has an elongated body, usually constructed of sheet stock spring steel such as steel strapping, and a plurality of longitudinally spaced pairs of laterally spaced teeth 20 inclined to the longitudinal axis of the spline and formed from the spline body symmetrically with respect to the lateral center line thereof. Conventionally, the joint is united by first inserting the spline laterally into a pair of opposed kerfs or slots 22 formed, as by a saw, in the edge members 16, the edge members 16 being chamfered adjacent the outer opening of the kerfs to assist the insertion of the spline therein. When the teeth 20 through engagement with the edge members 16 develop sufficient resistance to prevent further insertion of the spline, as shown in FIG. 2, the joint is set by longitudinally displacing the spline along the kerfs so that the teeth 20 coact with grooves cut thereby to bring the panels into abutment and to thereafter place a preload on the joint.

Figure 3:
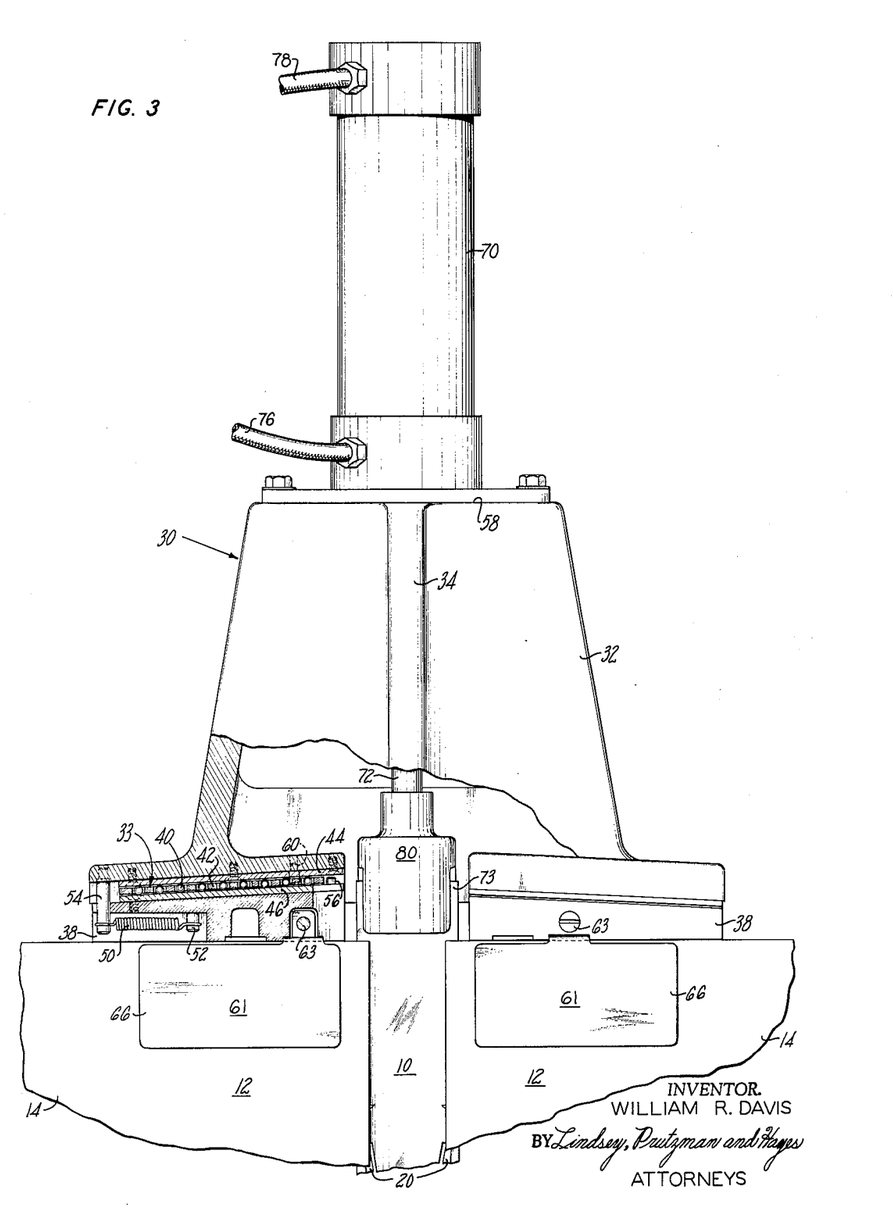
FIG. 3 is a front view, partly broken away and partly in section, of an embodiment of the tool of the present invention shown installed for setting the preassembled joint of FIG. 2.
Figures 4, 5:
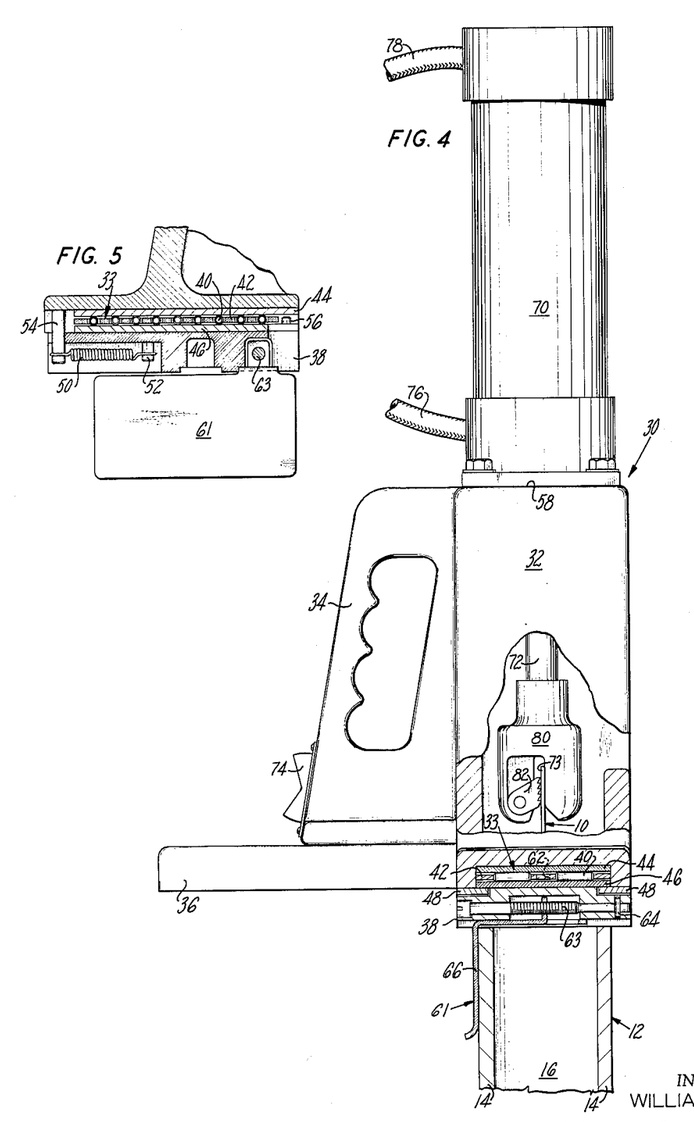
FIG. 4 is a side view, partly broken away and partly in section, of the installation of FIG. 3 showing a gripping head of the tool partially withdrawn.
FIG. 5 is a view, partly broken away and partly in section, of a portion of the tool of FIG. 3 shown modified in accordance with another embodiment of the present invention.

In accordance with the present invention, the spline 10 is longitudinally displaced in the kerfs 22 by a manually operable tool, an embodiment 30 of which is shown in FIGS. 3 and 4 and a modification thereof is shown in FIG. 5.

Referring now to FIGS. 3 and 4, the tool 30 comprises a frame or housing 32 having formed integrally therewith a spade handle 34. A pair of shoes 38 adapted for engagement with the ends of the panel members for longitudinal support of the tool thereon are mounted on the frame 32 for lateral movement in cooperation with the lateral movement of the panels occuring during the uniting of the joint. The shoes 38 are slideably mounted on the frame 32 by bearing assemblies 33 incorporating a plurality of roller bearings 40 retained by a separator 42. The upper race 44 of the bearing assemblies 33 is fixed to the frame and the lower race 46 thereof is fixed to the shoe and retained within the bearing cavity of the frame by a pair of elongated plates 48 secured to the frame (FIG. 4). A tension spring 50 having one end secured to a post 52 on the shoe and its opposite end secured to a post 54 on the frame urges the shoe laterally outwardly toward the post 54 which provides a stop therefor. A pin 56 mounted on the shoe is provided for insuring complete retraction of the bearing separator 42 and roller bearings 40 with the retraction of the shoe 38, and a stud 60 mounted on the frame and received within a slot 62 in the bearing separator provides a stop preventing travel of the roller bearings 40 past the end of the race 44. A supporting plate 36 formed integrally with the frame 32 is provided for mounting a third shoe (not shown) for use in construction a T-shaped joint incorporating a T-shaped spline. A depth guide 61 is adjustably mounted on each shoe by means of a threaded adjusting screw 63 retained on the shoe by a transverse pin 64. A depending plate 66 of the depth guide 61 is engageable with the panel for positioning the tool 30 thereon.

Mounted on a platform 58 of the frame 32 is a linear motor 70 of conventional design having an hydraulic operated reciprocating plunger (not shown) driving a connecting rod 72. A three position electrical switch 74 is mounted in the frame below the spade handle 34 for selective control of a remote electrically powered hydraulic pump (not shown) connected to opposite ends of the air motor 70 via air conduits 76, 78. The switch 74 is thereby adapted for retracting or extending the rod 72 or for holding the rod stationary. On the lower end of the rod 72 is mounted a gripping head 80 having a pivotally mounted serrated pawl 82 for gripping a protruding tab 73 of the spline received within the slotted end of the gripping head.

In operation, the tool of FIGS. 3 and 4 is positioned on the preassembled joint, as shown in FIG. 3, and the hydraulic motor 70 is fully extended to position the gripping head 80 for gripping the protruding tab 73 of the spline 10. The switch 74 is then actuated for supplying fluid under pressure to the motor 70 via the conduit 76 for retracting the rod and thereby pull the spline along the panel kerfs. Concurrently with the initial retraction of the gripping head, the panels are moved laterally into abutment. Further retraction of the gripping head provides for completing the setting of the joint. This type of joint is notably useful for connecting panels, as for example the 4' x 8' panels used extensively in present day construction. In such an application, the required force for setting the joint is of the order of 4000 pounds, in which case the force transmitted between each shoe 38 and the panel is of the order of 2000 pounds. Under this force it has been found that the tool shoes retard the lateral displacement of the panels, particularly at the ends of the panels adjacent the tool, with the result that the panel edges do not abut simultaneously along their entire length and there is an uneven distribution of the preloading along the completed joint. To overcome this retardation in the lateral movement of the panels, the axis of inward movement of the shoes has been inclined in the direction of withdrawal of the spline so that the reaction force on the shoes has a lateral component which urges the shoes and, therefore, the panels inwardly. Where desirable, however, as in applications where the problem of uneven lateral movement of the panels is not present, a shoe mounting, as shown in FIG. 5, with the shoes having parallel axes of movement normal to the axis of withdrawal of the gripping head can be used.

Figure 6:
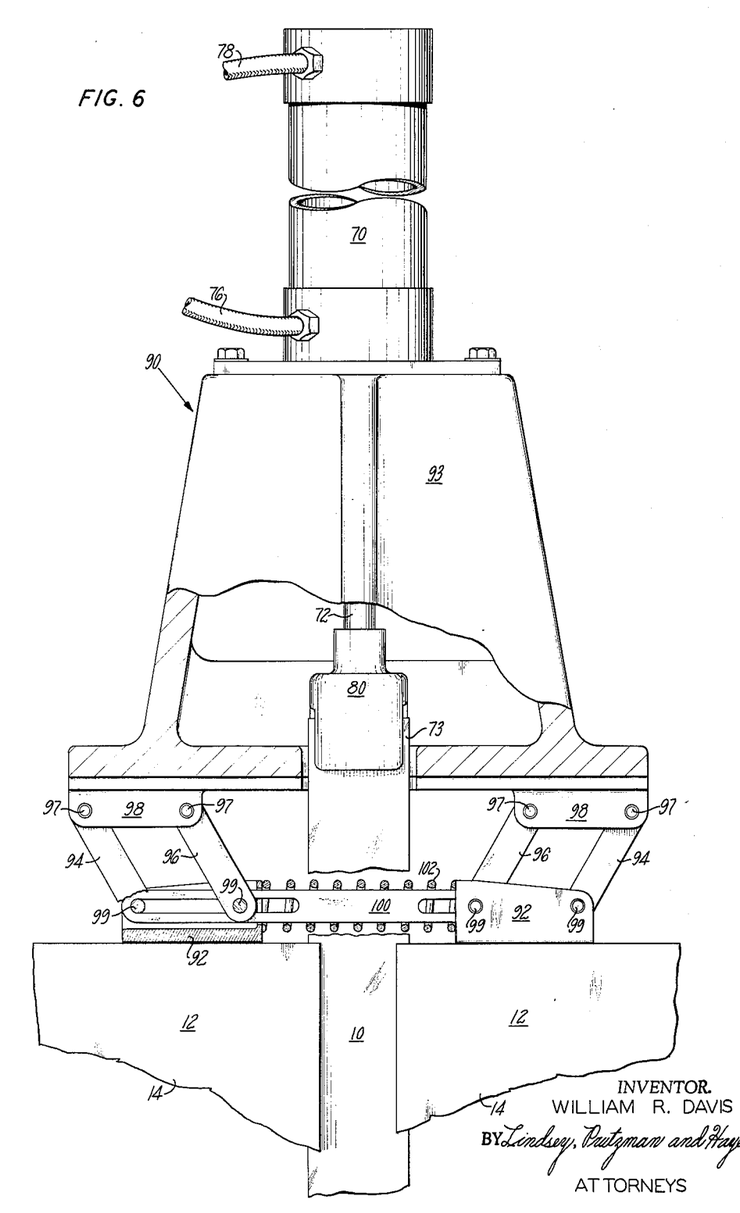
FIG. 6 is a front view, partly broken away and partly in section, of a tool installation similar to FIG. 3 showing another embodiment of the tool of the present invention.
Figure 7:
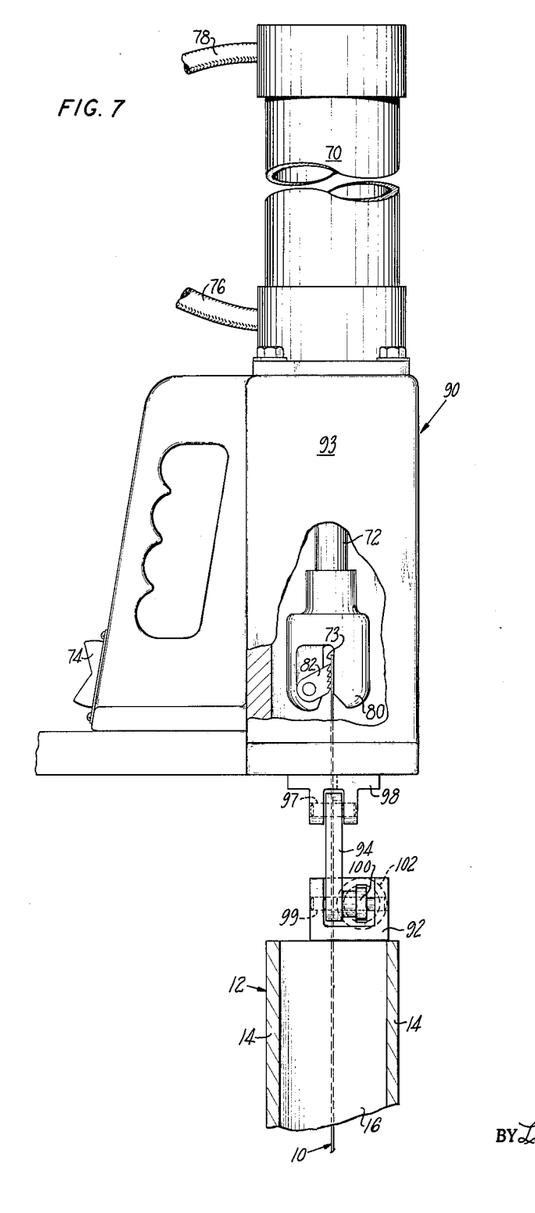
FIG. 7 is a side view, partly broken away and partly in section, of the installation of FIG. 6 showing a gripping head of the tool partially withdrawn.

An embodiment 90 of the tool of the present invention, shown in FIGS. 6 and 7, has a pair of shoes 92 connected to the frame 93 by a pair of parallel links 94, 96. The links are pivotally mounted by pivot pins 97 to a depending bifurcated lug 98 integrally formed on the underside of the frame 93 and by pivot pins 99 to the shoes 92, for which purpose the shoes 92 are centrally recessed for receiving the links. An aligning link 100 received within the shoe recesses is slotted to receive the pins 99 for maintaining the shoes in longitudinal alignment and for limiting the lateral travel of the shoes. A compression spring 102 encircling the aligning link 100 and compressed between the inner faces of the shoes 92 biases the shoes outwardly. Because of the inward inclination of the links 94, 96, the reaction force from the displacement of the spline has a lateral component which urges the shoes and consequently the panels inwardly, such force being countered in part only by the compression spring 102. As the shoes 92 move inwardly, the inclination of the links 94, 96 increases with the result that the lateral force component increases. This increasing force is opposed by an increasing bias of the compression spring 102, the spring being preferably designed so that the incremental spring bias substantially equals the incremental lateral force component. Consequently, as the spline is longitudinally displaced for setting the joint, the panels are urged into engagement with a lateral force that remains substantially constant throughout the setting of the spline.

Figure 8:
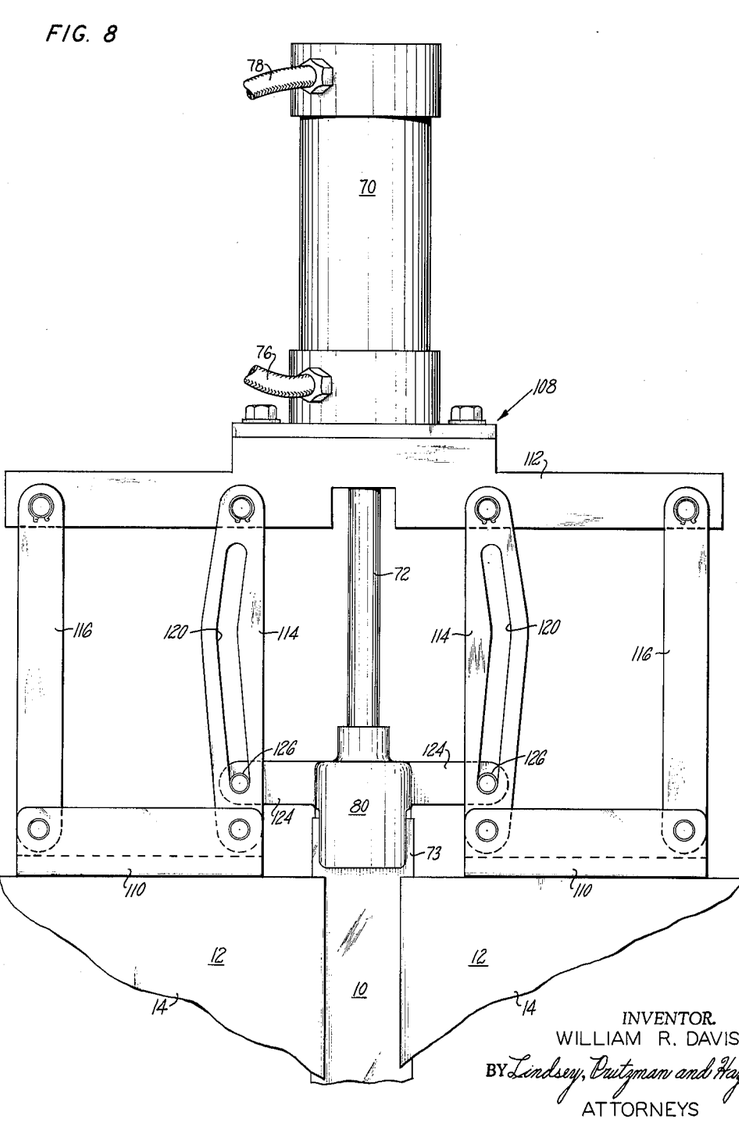
FIG. 8 is a front view, partly broken away, of a tool installation similar to FIG. 3 showing another embodiment of the tool of the present invention.

An embodiment 108 of the present invention shown in FIG. 8 comprises a pair of shoes 110 pivotally supported on a tool frame 112 by a pair of parallel links 114, 116, which, as shown, are substantially upright when the gripping head 80 is fully extended. The inner links 114 are provided with guide slots 120 and the gripping head 80 has fixed thereto a pair of oppositely extending arms 124 supporting at their outer ends guide rollers 126 received within the slots 120. The guide slots 120 are designed so that the shoes 110, and accordingly, the panels 12 are laterally displaced concurrently with the longitudinal displacement of the spline in accordance with the geometry of the inclined spline teeth. After the panels abut, further displacement of the shoes 110 is undesirable and accordingly the upper ends of the guide slots 120 are designed so that the shoes 110 remain stationary during the final longitudinal displacement of the gripping head 80. Consequently, the tool insures that the panels are laterally displaced in cooperation with the longitudinal displacement of the spline.

Figure 9:
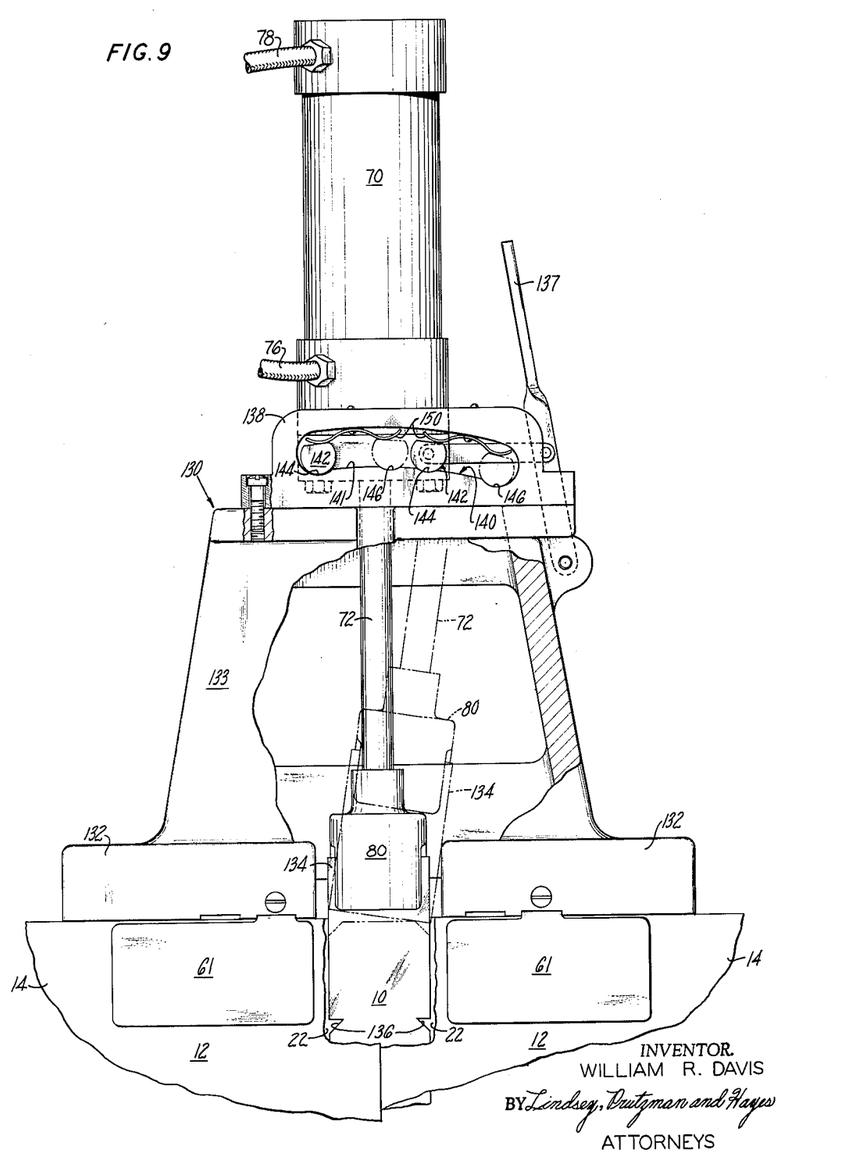
FIG. 9 is a front view, partly broken away, of a tool installation similar to FIG. 3 showing another embodiment of the tool of the present invention installed for setting a joint preassembled with the joint members in abutment.

An embodiment 130 of the tool of the present invention shown in FIG. 9 comprises a pair of shoes 132 fixed to the frame 133, this arrangement being particularly useful where the joint members are in abutment in the preassembled joint. As with the aforementioned embodiments, the linear motor 70 is operated to withdraw and extend the gripping head 80 with the tab end 134 of the spline being appropriately gripped by the head 80 for pulling the spline 10 upwardly. In the embodiment 130, however, the linear motor 70 is mounted on the frame 133 for pivotal movement controlled by a manual operating lever 137 pivotally mounted on the frame 133. The frame 133 has fixed thereon a pair of upstanding brackets 138 having slots 140 forming partially circular coaxial ways 141 whose common axis lies slightly inwardly of the plane of the outer edges of the panels. The motor has two pairs of oppositely extending supporting pins 142 which are received within the slots for supporting the motor on the ways 141. The ways 141 are recessed to provide pockets 144, 146 for receiving the pins 142, respectively, when the motor is in its upright position shown and in an inclined position. The pins 142 are partially flattened and a pair of leaf springs 150 mounted on the brackets 138 within the slots 140 engage the flattened portion of the pins for assistance in retaining the motor in its upright and inclined positions. When the spline is fully set, the motor is moved to angularly shift the connecting rod 72 and gripping head 80, as seen in phantom in FIG. 9, for concentrating the retracting force of the motor on an edge of the spline with the result that the tab 134 is torn from the spline. For assistance in locating the line of severance of the tab, V-shaped notches 136 are preferably provided in the spline.

Figures 10, 11:
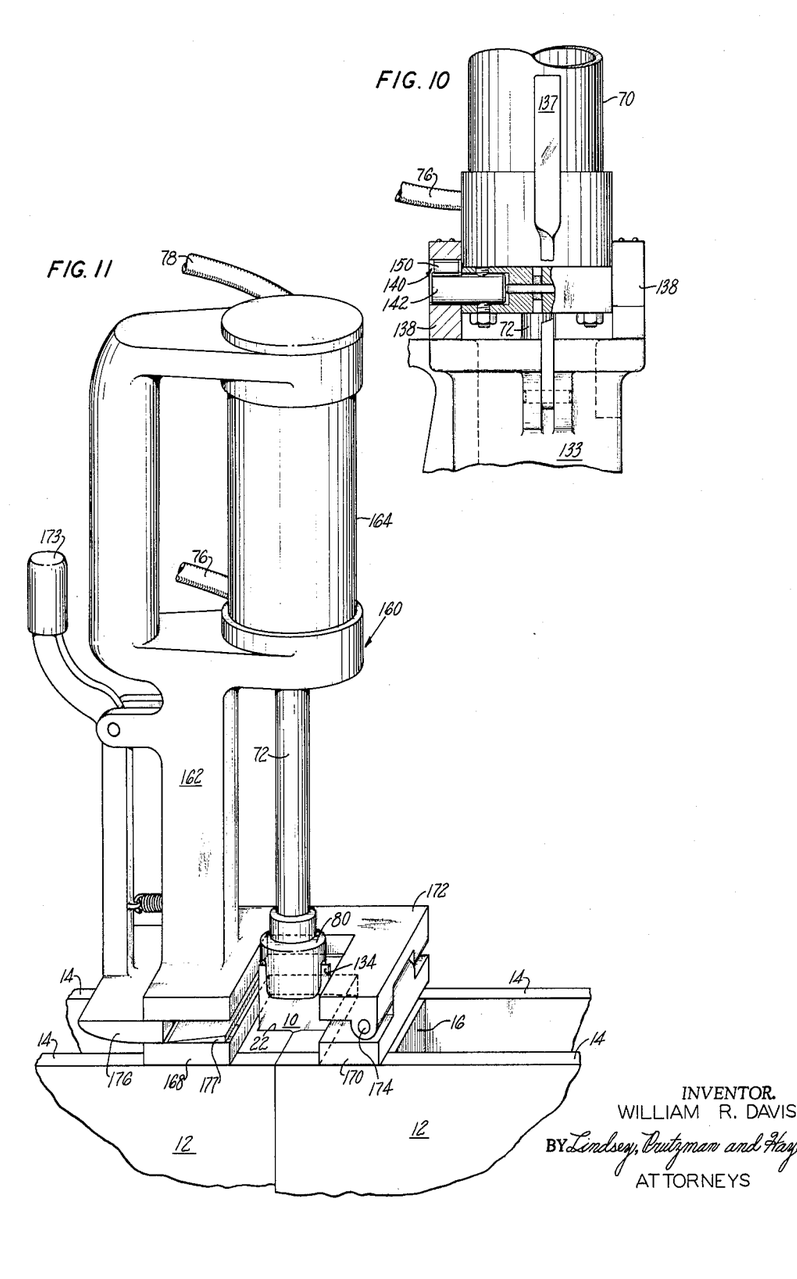
FIG. 10 is a partial side view, partly broken away and partly in section, of the tool of FIG. 9.
FIG. 11 is an isometric view of an installation similar to FIG. 9 showing another embodiment of the tool of the present invention.

An embodiment 160 of the tool of the present invention is shown in FIG. 11. In this embodiment, the tool frame 162 has mounted thereon a motor 164 with a connecting rod 72 supporting a gripping head 80. A pair of integrally connected shoes 168, 170 are spaced beneath a base 172 of the frame and pivotally mounted thereto by means of a pivot pin 174. A spacer 176 positioned between the base 172 and the shoe 168 locates the shoes with their lower faces in a plane extending perpendicular to the longitudinal axis of the motor. After the spline 10 is displaced for setting the joint, the spacer 176 is manually pivoted from between the shoe 168 and the base 172, as by a handle 173, to allow the base to pivot into contact with a stop 177. As with the embodiment of FIG. 9, the pivotal movement of the connecting rod concentrates the motor force on the edge of the spline tab 134 to tear tab 134 from the spline.

From the above description of the several embodiments of the tool of the present invention, it can be seen that the tool is readily operable even by one having little skill for displacing the spline in the panels and for continually maintaining the panels in lateral and longitudinal alignment until the joint is united. Additionally, the tool of the present invention assists and/or controls the lateral displacement of the joint members in cooperation with the longitudinal displacement of the spline. Further, the tool of the present invention can readily remove the protruding tab portion of the spline conventionally provided for gripping the spline.

As will be apparent to persons skilled in the art, various modifications and adaptations of the structure above described will become readily apparent without departure from the spirit and scope of the invention, the scope of which is defined in the appended claims.

I claim:

1. For use in uniting a preassembled joint of a pair of members having opposed elongated slots receiving a fastener therein, the uniting being accomplished by longitudinally displacing the fastener in the slots, a tool comprising a frame, a pair of laterally spaced shoes mounted on the frame engageable with the joint members for longitudinal support of the tool, means attachable to the fastener mounted on the frame between the shoes for longitudinal withdrawal movement from the joint members, means for longitudinally withdrawing the attachable means for displacing the fastener in the slots, and bearing means mounting the shoes for lateral movement on the frame.

2. For use in uniting a preassembled joint of a pair of members having opposed elongated slots receiving a fastener therein, the uniting being accomplished by longitudinally displacing the fastener in the slots, a tool comprising a frame, a pair of laterally spaced shoes mounted on the frame engageable with the joint members for longitudinal support of the tool, means attachable to the fastener mounted on the frame between the shoes for longitudinal withdrawal movement from the joint members, means for longitudinally withdrawing the attachable means for displacing the fastener in the slots, linkage means mounting the shoes on the frame for combined lateral and longitudinal movement, and means maintaining the shoes in longitudinal alignment.

3. For use in uniting a preassembled joint of a pair of members having opposed elongated slots receiving a fastener therein, the uniting being accomplished by longitudinally displacing the fastener in the slots, a tool comprising a frame, a pair of laterally spaced shoes mounted on the frame engageable with the joint members for longitudinal support of the tool, means attachable to the fastener mounted on the frame between the shoes for longitudinal withdrawal movement from the joint members, means for longitudinally withdrawing the attachable means for displacing the fastener in the slots, means mounting the shoes on the frame for lateral movement, and means connecting the attachable means and shoes coordinating the lateral movment of the shoes with the longitudinal withdrawal movement of the attachable means.

4. For use in uniting a preassembled joint of a pair of members having opposed elongated slots receiving a fastener therein, the uniting being accomplished by longitudinally displacing the fastener in the slots, a tool comprising a frame, a pair of laterally spaced shoes mounted on the frame engageable with the joint members for longitudinal support of the tool, means attachable to the fastener mounted on the frame between the shoes for longitudinal withdrawal movement from the joint members, means for longitudinally withdrawing the attachable means for displacing the fastener in the slots, and means for angularly shifting the direction of withdrawal movement of the attachable means.

5. The tool of claim 4 wherein the shoes are integrally connected and wherein the shifting means comprises means pivotally connecting the shoes and the frame, and selectively operable means for limiting the pivotal movement of the frame.

6. The tool of claim 4 wherein the means for withdrawing the attachable means is a fluid-operated linear motor directly connected thereto and wherein the shifting means includes a pair of parallel arcuate ways on the frame, oppositely extending supporting means connected to the motor in engagement with the ways, and manually operable means for shifting the motor on the ways.

7. The tool of claim 2 further comprising spring means for increasingly biasing the shoes laterally apart with decreasing lateral distance between the shoes.

8. The tool of claim 1 wherein the bearing means provides for inward movement of the shoes on the frame along axes inclined outwardly from the joint members.

References Cited by the Examiner

UNITED STATES PATENTS 2,846,737 8/1958 Propst.
2,967,044 1/1961 Corcreham et al. _____ 254—30

WILLIAM FELDMAN, *Primary Examiner.*

MILTON S. MEHR, *Examiner.*